United States Patent
Nierenberg et al.

(10) Patent No.: US 6,774,555 B2
(45) Date of Patent: Aug. 10, 2004

(54) CATHODE RAY TUBE HAVING A REPLACEABLE GETTER ATTACHMENT ASSEMBLY

(75) Inventors: Mort Jay Nierenberg, Lancaster, PA (US); Kelly Eugene Hamm, Holtwood, PA (US); Douglas David Harding, Narron, PA (US); Stephen Thomas Opresko, Lancaster, PA (US); Hale Andrew Johnson, Willow Street, PA (US)

(73) Assignee: Thomson Licensing S. A., Boulogne-Billancourt (FR)

( * ) Notice: Subject to any disclaimer, the term of this patent is extended or adjusted under 35 U.S.C. 154(b) by 0 days.

(21) Appl. No.: 10/138,124

(22) Filed: May 3, 2002

(65) Prior Publication Data

US 2003/0205962 A1 Nov. 6, 2003

(51) Int. Cl.[7] ................................................. H01J 29/94
(52) U.S. Cl. ................ 313/481; 313/482; 313/477 HC; 313/477 R; 313/44; 313/553; 417/48; 417/49; 417/50; 417/51
(58) Field of Search ............................ 313/481, 477 R, 313/482, 477 HC, 44, 553; 417/48–51

(56) References Cited

U.S. PATENT DOCUMENTS

| 3,979,806 | A | * | 9/1976 | Woodard ..................... 445/70 |
| 4,225,805 | A | * | 9/1980 | Smithgall et al. ........... 313/481 |
| 4,614,896 | A | * | 9/1986 | Josephs et al. ............. 313/481 |
| 5,350,970 | A | * | 9/1994 | Vennix et al. .............. 313/481 |
| 5,541,474 | A | | 7/1996 | LaPeruta et al. |
| 6,310,435 | B1 | | 10/2001 | Hageluken et al. |

FOREIGN PATENT DOCUMENTS

| DE | 77 26 914 | 2/1978 |
| EP | 0 544 351 A1 | 6/2003 |

OTHER PUBLICATIONS

Patent Abstract of Japanese Publication No.: 54157469, Published Dec. 12, 1979.
Patent Abstract of Japanese Publication No.: 06089674, Published Mar. 29, 1994.

* cited by examiner

Primary Examiner—Ashok Patel
Assistant Examiner—Holly Harper
(74) Attorney, Agent, or Firm—Joseph S. Tripoli; Joseph J. Laks; Carlos M. Herrera

(57) ABSTRACT

A CRT including an evacuated envelope with a color selection electrode assembly disposed within the envelope, and an internal magnetic shield (IMS) secured to the color selection electrode assembly, and having a replaceable getter attachment assembly comprising a mounting rail and replaceable getter portion. The mounting rail having a first portion with a coupling clip attached to the IMS and a second portion extending therefrom. The replaceable getter portion includes a first end extending from the mounting rail with a getter cup attached thereto and a second end detachably attached to the second portion of the mounting rail. The replaceable getter portion extends from the mounting rail to deposit a film of evaporated getter material therefrom within the envelope.

7 Claims, 3 Drawing Sheets

CATHODE RAY TUBE HAVING A REPLACEABLE GETTER ATTACHMENT ASSEMBLY

FIELD OF THE INVENTION

This invention relates to cathode ray tubes (CRTs), and more particularly to an assembly for replaceably mounting a getter inside a CRT.

BACKGROUND OF THE INVENTION

A color cathode ray tube (CRT), has an electron gun mount assembly for forming and directing three electron beams to a luminescent screen containing phosphor deposits located on a glass faceplate panel. A shadow mask frame assembly (or otherwise known as a color selection electrode) comprising either a formed mask or a tension mask, is located between the electron gun mount assembly and the screen. The electron beams emitted from the electron gun mount assembly pass through apertures in the shadow mask and strike the screen causing the phosphor deposits to emit light so that an image is displayed on a viewing surface of the faceplate panel. An internal magnetic shield (IMS) is fastened to the shadow mask frame to reduce the influence of ambient magnetic fields on the electron beam trajectories.

The CRT operates within a vacuum maintained within a sealed envelope. The envelope is evacuated and sealed during the manufacture of the CRT. Because the vacuum can degrade over the life of the CRT by the outgassing of various components sealed inside the envelope, a getter is placed inside the envelope during manufacture to prevent degradation of the vacuum. The getter typically contains primarily barium compounds in a getter cup that are flashed or vaporized after the envelope is sealed by placing a RF coil near the outside of the CRT funnel adjacent the getter. The RF energy from the activated coil vaporizes the getter material and deposits the getter material on surfaces within the envelope. The vaporized getter material absorbs and reacts with residual gas molecules in the CRT, removes the molecules, and continues to absorb any further liberated gases throughout the life of the CRT.

A getter assembly, which includes the getter attached to a getter spring, is often attached to the top or anode cup of the electron gun mount assembly. The getter is positioned out of the yoke region to minimize any interference of the getter with the magnetic field generated by the yoke. This getter assembly configuration is referred to as an antenna getter spring assembly. This configuration is particularly applicable to CRTs having deflection yokes that operate at relatively slow rates (1H). In CRT's employing higher scan-rate yokes (2H or higher), it is more desirable to have the getter spring assembly positioned even further away from the yoke because the getter assembly has a greater tendency to distort the magnetic field of the yoke in higher scan-rate yokes. Consequently, some CRT manufacturers place the getter further toward the screen in the CRT envelope. In these cases, the getter is attached to the shadow mask frame or the exterior side of the IMS.

In the CRT industry, it has been found necessary from time-to-time to replace the electron gun mount assembly in finished CRTs wherein the getters have already been flashed. CRT's with replaced mount assemblies are referred to as re-necked tubes. When antenna getter spring assemblies cannot be utilized (e.g., in systems with high scan-rate yokes) a replacement getter spring assembly may not be readily replaced and attached to the mask or IMS in an open envelope.

It is therefore desirable to develop a getter assembly wherein the getter may be easily replaced within the CRT, yet remain stationary for the life of the CRT. Such a replaceable getter assembly would decrease manufacturing costs and increase manufacturing efficiency for re-necked tubes.

SUMMARY OF THE INVENTION

This invention relates to a cathode ray tube (CRT) having a replaceable getter attachment assembly for removeably securing a getter within the CRT. The CRT includes a funnel sealed at one end to a faceplate panel with a luminescent screen on an inside surface thereof, a color selection electrode assembly disposed within said envelope and in proximity to said screen, and an internal magnetic shield (IMS) secured to the color selection electrode assembly. The getter attachment assembly includes a mounting rail and a replaceable getter portion. The mounting rail comprises a first portion having a coupling clip for attaching the mounting rail to the internal magnetic shield and a second portion extending therefrom. The replaceable getter portion is detachably attached to the second portion of the mounting rail and extends from the mounting rail to a distal end to which a getter is attached for depositing a film of evaporated getter material within the envelope.

BRIEF DESCRIPTION OF THE DRAWINGS

The invention will now be described by way of example with reference to the accompanying figures in which.

DETAILED DESCRIPTION OF THE PREFERRED EMBODIMENTS

Figure 1:
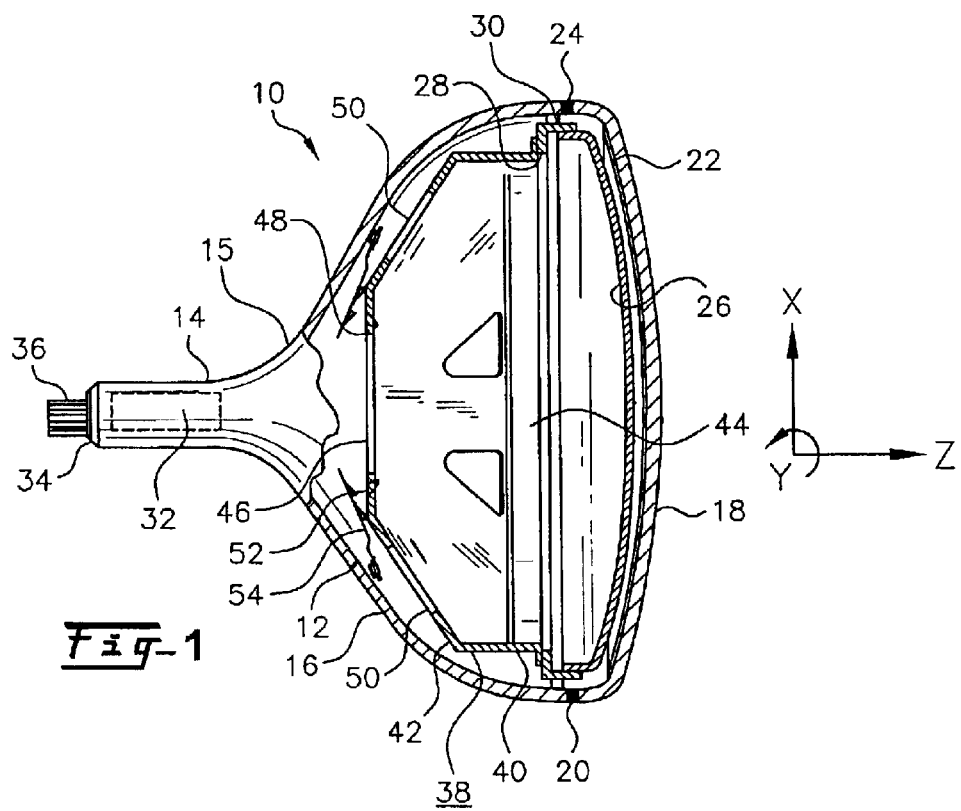
FIG. 1 is a cross-sectional view of a CRT with the getter attachment assembly installed within a CRT.

FIG. 1 shows a cathode ray tube (CRT) 10 having an evacuated glass envelope 12 comprising a cylindrical neck 14 and a yoke 15 extending from the small end of a funnel 16. The large end of the funnel 16 is closed by a faceplate panel 18, which is integrally joined at a frit seal line 20. A phosphor screen 22 is arranged on the inside surface of the faceplate panel 18. The phosphor screen 22 is composed of phosphor elements, each of which emits one of the three primary colors of light when impacted by three electron beams. The envelope 12 has a central longitudinal tube Z axis which passes through the faceplate panel 18, the funnel 16, and the neck portion 14. The tube has a plane perpendicular to the longitudinal Z axis and includes two orthogonal axes; a major X axis, parallel to its wider dimension (usually horizontal), and a major Y axis, parallel to its narrower dimension (usually vertical).

A mask-frame assembly 24, comprising an aperture color selection electrode or shadow mask 26 is attached to a peripheral frame 28. The mask-frame assembly 24 is removably mounted within the faceplate panel 18 by springs 30 and is approximately perpendicular to the central longitudinal axis Z in predetermined spaced relation to the phosphor screen 22. The shadow mask 26 is spaced from the phosphor screen 22 and is used to direct the three electron beams to the phosphors, which emit the appropriate colors of light. An electron gun mount assembly 32 (shown schematically in FIG. 1) is centrally mounted within the neck 14 and generates and directs three inline electron beams, a center beam and two side or outer beams, along convergent paths through the shadow mask 26 to the screen 22. The distal end of the neck portion 14 is closed by a stem 34 having terminal pins or leads 36 therethrough on which the electron gun mount assembly 32 is supported and through which electrical connections are made to various elements of the electron gun mount assembly 32.

Figure 2:
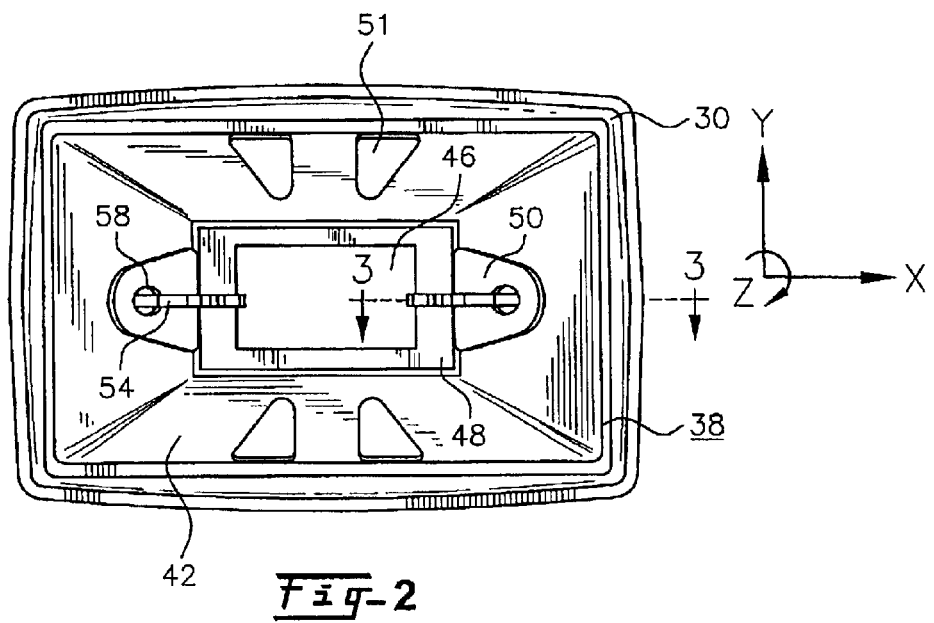
FIG. 2 is a plan view of an IMS and a faceplate panel showing the getter attachment assembly secured to the IMS.

As shown in FIGS. 1 and 2, an internal magnetic shield (IMS) 38 lies within the funnel 16 and is securely attached to the rear portion of the mask-frame assembly 24 by attaching L-shaped flanges 40 to the peripheral frame 28 by welding or pinning. The IMS 38 has generally a truncated pyramidal shape having sidewalls 42. The IMS 38 has a front open end 44, arranged in the proximity of the faceplate panel 18, and a rear open end 46, arranged remote from the faceplate panel 18 and facing the electron gun mount assembly 32. The rear open end 46 permits entry of the electron beams into the IMS 38 and is defined by a ledge 48 extending inward from the sidewall 42 toward the Z axis. The ledge 48 is formed with openings 52 to accept the getter attachment assembly 54 having an evaporable or flashable getter 58, as will be described in detail below. The triangular apertures 51 are used to tune the magnetic field shaping characteristics of the IMS 38 for the specific tube where it is being employed.

Referring now to FIG. 2, there is illustrated a plan view from the rear in the direction of the Z axis showing a plurality of apertures 50 formed through the sidewall 42 of the IMS 38. For clarity, the funnel 16 and electron gun mount assembly 32 are not shown. The locations and size of the apertures 50 are shown as extending symmetrically from the outer perimeter of the ledge 48 toward the frame 28 and centered along the major X axis with the width of the apertures 50 being wider at the sides thereof facing the rear open end 46. The apertures 50 permit a film, or deposit, of gas-absorbing material from the getter 58, i.e. flashed getter material, to pass through the sidewall 42 of the IMS 38 and into the interior walls of the CRT 10 and the IMS 38. The apertures 50 are preferably sized so that the flashed getter material deposited on exterior side of the sidewalls 42 is minimized and the deposited getter material dispersed to attain a maximum surface area within the CRT 10.

Figure 3:
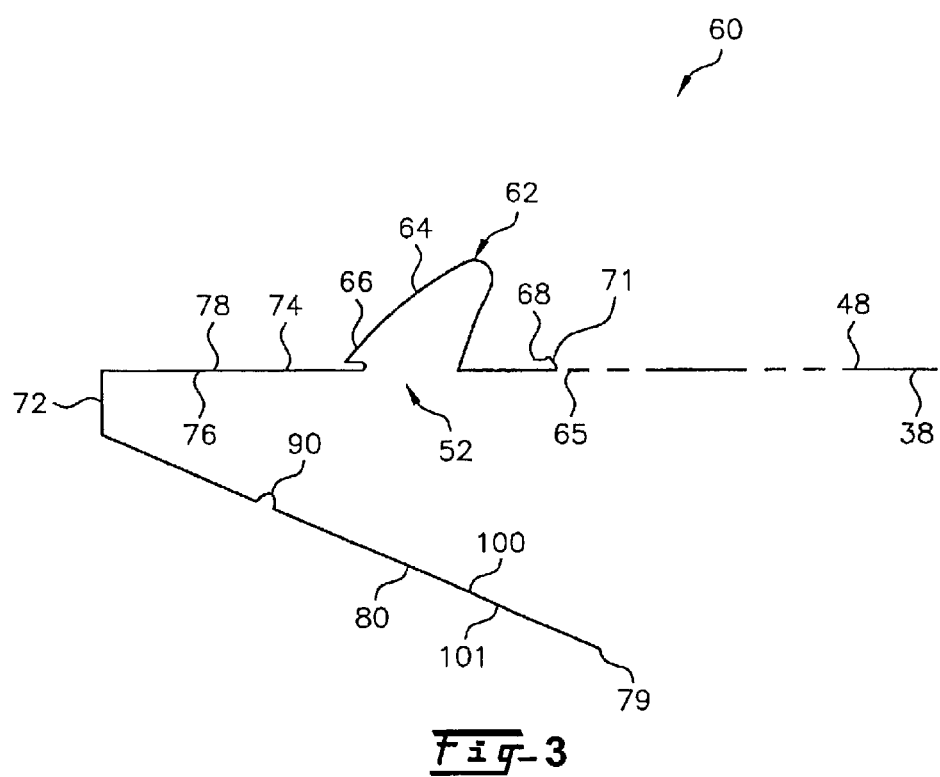
FIG. 3 is a side view of a supplemental mounting rail.
Figure 4:
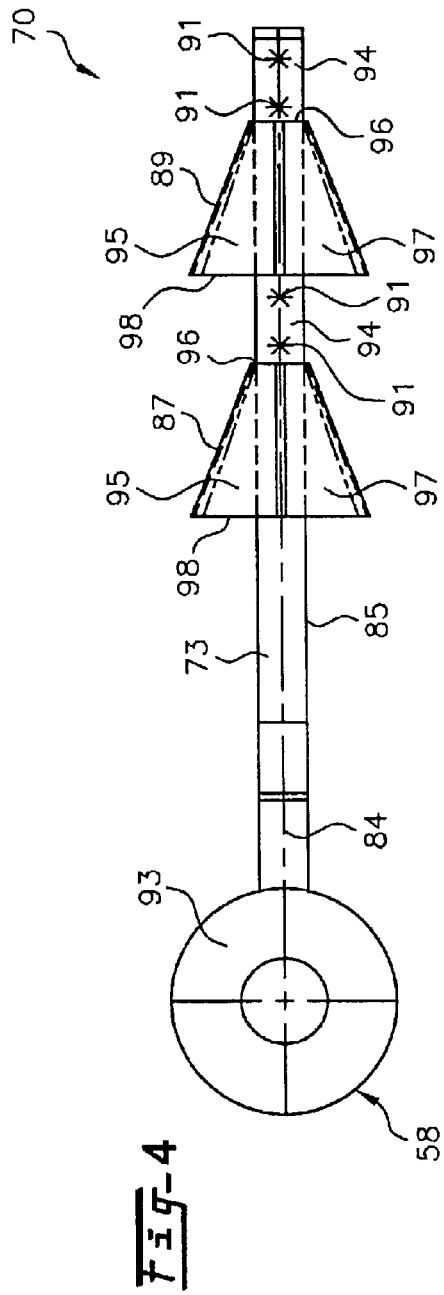
FIG. 4 is a top view of a replaceable getter portion.
Figure 5:
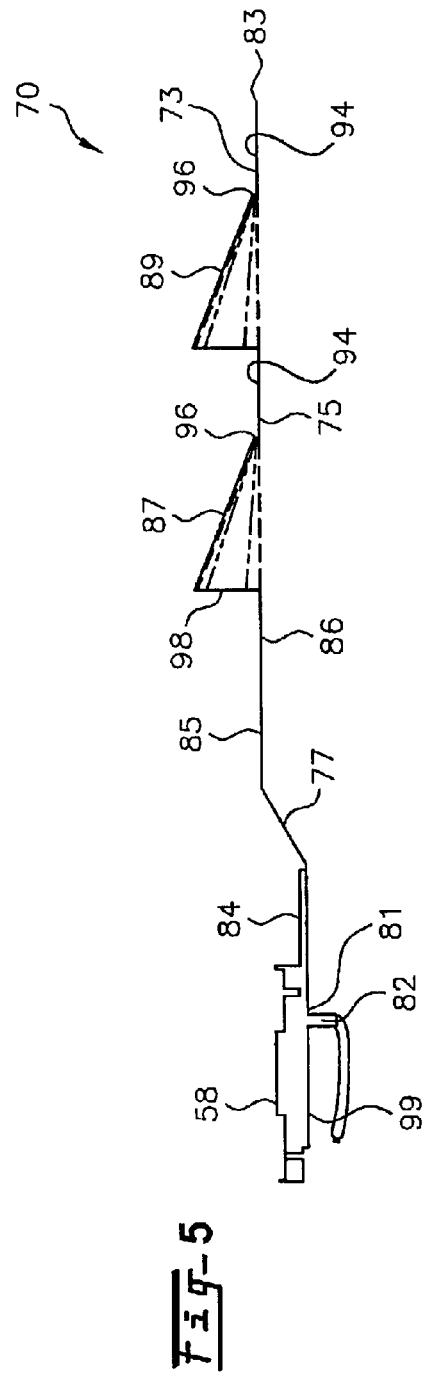
FIG. 5 is a side view of the replaceable getter portion.

The getter attachment assembly 54 comprises a mounting rail 60 as shown in FIG. 3 and a replaceable getter portion 70 as shown in FIGS. 4 and 5. The mounting rail 60 has a first portion 78 and a second portion 80 positioned substantially adjacent to the first portion 78. A central portion 72 joins the second portion 80 to the first portion 78. The first portion 78 has an exterior surface 74 and an interior surface 76, that extend from the central portion 72 to an end 71. The exterior surface 74 of the first portion 78 comprises a resilient fastening member, such as a coupling clip 62. The coupling clip 62 has a substantially V-shaped portion 64, a shoulder 66, and a grasping portion 68 formed to provide a projected corner. It should be understood by those skilled in the art that while the coupling clip 62 has been described with a certain configuration, that other geometrical configurations may be used to obtain similar results. The central portion 72 is substantially perpendicular to the first portion 78 and joins the second portion 80 to the first portion 78. The second portion 80 has a terminating end 79. A tang 90 is formed on the inner surface 100 of the second portion 80. As shown in FIGS. 4 and 5, the replaceable getter portion 70 comprises a mounting section 85 having a getter 58 and first and second pyramid shaped lead-ins 87, 89 attached thereto.

The mounting section 85 has a first side 73, a second side 75, and first and second ends 81, 83, respectively. A getter 58 is attached near the first end 81. The getter 58 comprises a metal cup 93 with a closed base 99 that contains a gas-absorbing material (not shown). The closed base 99 has a standoff portion 82 that is positioned adjacent to the first end 81 and a protruding portion 84 that extends over the first side 73 for attachment of the cup 93. Continuing to move toward the second end 83, the mounting section 85 is formed to create an offset 77 toward the first side 73. The mounting section 85 then forms a substantially flat portion 86 extending to the second end 83.

As shown in FIGS. 4 and 5, the first and second pyramid shaped lead-ins 87, 89 are attached to the first side 73 of the flat portion 86. Each of the pyramid shaped lead-ins 87, 89 has a receiving portion 98, a holding portion 96, and an attachment strip 94. Each of the lead-ins 87, 89 is formed by converging a first segment 97 and a second segment 95 of a continuous piece to form a substantially pyramid shape. It should be understood that while the lead-ins 87, 89 are described here as having a pyramid shape, other geometric configurations which achieve the same locking and securing functions are within the scope of the invention. The receiving portion 98 is wider than the holding portion 96, and the attachment strip 94 extends from the holding portion 96. A bottom portion of the attachment strip 94 is attached to the first side 73 of the mounting section 85 by spot welds 91.

The attachment of the mounting rail 60 to the IMS 38 will now be described in greater detail with reference to FIGS. 1 and 2. The first portion 78 of the mounting rail 60 is attached to the IMS 38 and the central portion 72 of the mounting rail 60 is positioned substantially adjacent to the first portion 78 and between the IMS 38 and the funnel 16. The coupling clip 62 on the exterior surface 74 of the first portion 78 is inserted into the opening 52 provided through the ledge 48 of the IMS 38. The shoulder 66 of the clip 62 contacts the underside of the ledge 48 of the IMS 38, and the grasping portion 68 contacts the edge of notch 65 and the ledge 48 of the IMS 38. The coupling clip 62 provides coupling forces by the elastic force of the V-shaped portion 64 and the grasping portion 68 to retain the clip 62 within the opening 52. The second portion 80 of the mounting rail 60 extends from the IMS and is positioned between the exterior side of the IMS and inside surface of the funnel 16 and receives the replaceable getter portion 70. The tang 90 formed on the inner surface 100 holds the replaceable getter portion 70 in position so that when the replaceable getter portion 70 is attached to the second portion 80 of the mounting rail 60, the getter 58 is positioned at the aperture 50.

The attachment of the replaceable getter portion 70 to the mounting rail 60 will now be described in greater detail. It will be appreciated by one skilled in the art that removal of the replaceable getter portion 70 may be accomplished in substantially the same way. The replaceable getter portion 70 is releasably attached to a conventional tool having a trigger release. The tool inserts the replaceable getter portion 70, getter 58 first, through an open neck portion 14 of the CRT 10. The tool guides the replaceable getter portion 70 between the IMS 38 and the funnel 16. The getter 58 surpasses the second portion 80 of the mounting rail 60. The receiving portion 98 of the first pyramid shaped lead-in 87 receives the terminating end 79 of the second portion 80. The terminating end 79 of the second portion 80 is then received in the holding portion 96 of the first pyramid shaped lead-in 87. Then, the receiving portion 98 of the second pyramid shaped lead-in 89 receives the terminating end 79 of the second portion 80. The terminating end 79 of the second portion 80 is then received in the holding portion 96 of the second pyramid shaped lead-in 89. The tool then releases the replaceable getter portion 70 and is removed from the inside of the CRT 10. It should be noted that the when the replaceable getter portion 70 is inserted the pyramid shaped lead-ins 87, 89 are flexed inward toward the mounting section 85 to permit the replaceable getter portion 70 to slide along the second portion and permit at least one pyramid shaped lead-in to pass the tang 90 and to be engaged therewith. Once at least one of the pyramid shaped lead-ins is pushed passed the tang 90, the replaceable getter portion 70 will not come off, unless this portion 70 is pulled off.

As a result of the insertion of the replaceable getter portion 70, the first side 73 of the mounting section 85 is positioned adjacent to the outer surface 101 of the second portion 80 of the mounting rail 60, and the lead-ins 87, 89 are positioned adjacent to the inner surface 100 of the second portion 80. The holding portion 96 of the first pyramid shaped lead-in 87 is positioned adjacent to the tang 90 and closer to the central portion 72 of the mounting rail 60. The tang 90 releasably holds the replaceable getter portion 70 in position for the life of the CRT.

Advantageously, if the electron gun fails during testing, it can be replaced and the getter component of this invention allows for a getter replacement before resealing a new mount assembly 32 onto the neck 14 and re-evacuating of the CRT 10.

What is claimed is:

1. A cathode ray tube having a replaceable getter attachment assembly, the cathode ray tube having a funnel sealed at one end to a faceplate panel with a luminescent screen on an inside surface thereof and forming an envelope with a neck at a second end opposite the faceplate panel; a color selection electrode assembly disposed within the envelope and in proximity to the screen; and an internal magnetic shield secured to said color selection electrode assembly, the magnetic shield having an exterior side extending along at least a portion of the funnel and being spaced therefrom, the replaceable getter attachment assembly comprising:

a mounting rail having a first portion and a second portion, the first portion being secured to the internal magnetic shield and the second portion extending therefrom in a direction toward the neck; and a replaceable getter portion having an mounting section being removeably attachable to the second portion and extending to an end to which a getter cup is attached within the envelope to deposit a film of evaporated getter material therefrom.

2. The cathode ray tube of claim 1, wherein the attachment assembly further comprises a pyramid shaped lead-in for receiving the second portion.

3. The cathode ray tube of claim 2, wherein the second portion of the mounting rail has a tang for detachably securing the pyramid shaped lead-in to the mounting rail.

4. The cathode ray tube of claim 1, wherein the mounting rail has a central portion joining the first portion and the second portion.

5. The cathode ray tube of claim 1, wherein the mounting rail further comprises a coupling clip extending from the first portion for securing the mounting rail to the internal magnetic shield.

6. A cathode ray tube having a replaceable getter attachment assembly, the cathode ray tube including an evacuated envelope with a neck at one end and a color selection electrode assembly disposed within the envelope and an internal magnetic shield secured to the color selection electrode assembly, the magnetic shield having an exterior side extending along at least a portion of the funnel and being spaced therefrom, the replaceable getter attachment assembly comprising:

a mounting rail secured within the envelope and extending toward the neck and a replaceable getter portion comprising a first end and a second end, the second end includes a mounting section for detachably attaching the replaceable getter portion to the mounting rail, and the first end extends from the mounting rail and includes a getter cup attached thereto to deposit a film of evaporated getter material therefrom within the envelope, wherein the mounting rail further comprises a coupling clip for securing the mounting rail to the internal magnetic shield.

7. The cathode ray tube of claim 6 wherein the replaceable getter portion further comprises a mounting section including at least one lead-in and the mounting rail further comprises a first portion and a second portion, the first portion being secured to the internal magnetic shield and the second portion extending therefrom and including a tang for receiving the lead-in and detachably securing the replaceable getter portion within the envelope.

* * * * *